United States Patent [19]

Pines et al.

[11] Patent Number: 5,049,740
[45] Date of Patent: Sep. 17, 1991

[54] MULTIPLE FIELD OF VIEW SENSOR

[75] Inventors: Michael Y. Pines, Los Angeles; Themi H. Demas, both of Los Angeles; Robert D. Schaefer, Huntington Beach, all of Calif.

[73] Assignee: Hughes Aircraft Company, Los Angeles, Calif.

[21] Appl. No.: 917,944

[22] Filed: Aug. 26, 1986

Related U.S. Application Data

[63] Continuation-in-part of Ser. No. 686,357, Dec. 26, 1984, abandoned.

[51] Int. Cl.$^5$ .......................... H01J 3/14; G02B 26/10
[52] U.S. Cl. .................... 250/235; 250/347; 250/351; 359/214
[58] Field of Search ............... 250/347, 334, 351, 339, 250/345, 234, 235; 356/323, 325, 343; 358/206, 208; 350/6.6

[56] References Cited

U.S. PATENT DOCUMENTS

| | | | |
|---|---|---|---|
| 3,519,352 | 7/1970 | Engborg | 356/43 |
| 3,804,976 | 4/1974 | Gard | 358/113 |
| 4,057,734 | 11/1977 | Barringer | 250/345 |
| 4,455,097 | 6/1984 | Ichikawa et al. | 356/323 |
| 4,486,662 | 12/1984 | Abel | 250/334 |
| 4,574,197 | 3/1986 | Kliever | 250/334 |
| 4,577,106 | 3/1986 | Fukasawa et al. | 250/347 |

FOREIGN PATENT DOCUMENTS 1522286  8/1969  Fed. Rep. of Germany .
8403777  9/1984  PCT Int'l Appl. .
2106267  4/1983  United Kingdom .

Primary Examiner—Edward P. Westin
Attorney, Agent, or Firm—William J. Streeter; Wanda K. Denson-Low

[57] ABSTRACT

Images of two fields of view of one or two scenes in a radiation sensor are generated by use of a single detector and common signal process circuitry. The two imaged fields of view, typically a narrow view and a wide view, are provided by two independent telescopes (18, 20), and are combined by use of a field-of-view switch (32) comprising a chopper wheel (34) or an optical switch in synchronized operation with a mirror scanner (22). The same field-of-view switch is employed in performing detector non-uniformity correction functions, such as automatic responsivity control and direct current restoration. Folding optics couples scanned radiation from the scanner to the switch. An additional field of view may be introduced by displacing a folding mirror of the folding optics. Also, a portion of a reflecting surface of the switch may be tilted to admit a reference beam of radiation useful in performing the functions of responsivity control and D.C. restoration.

9 Claims, 5 Drawing Sheets

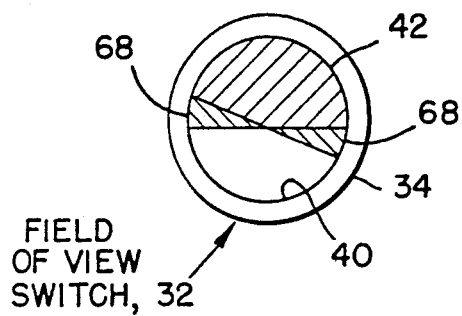
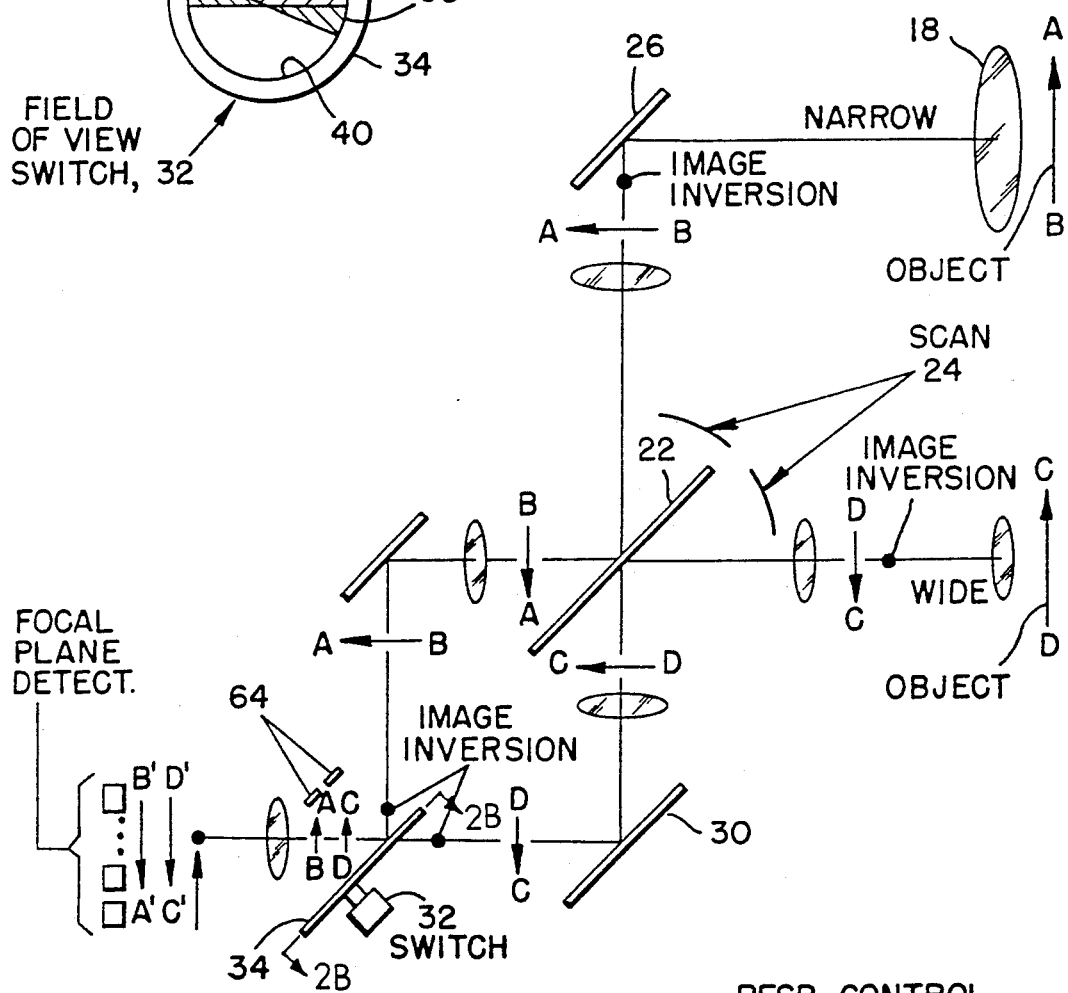
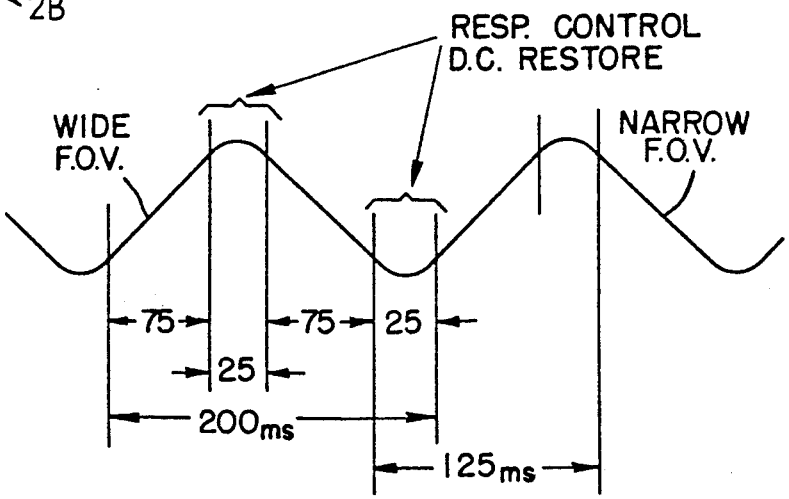

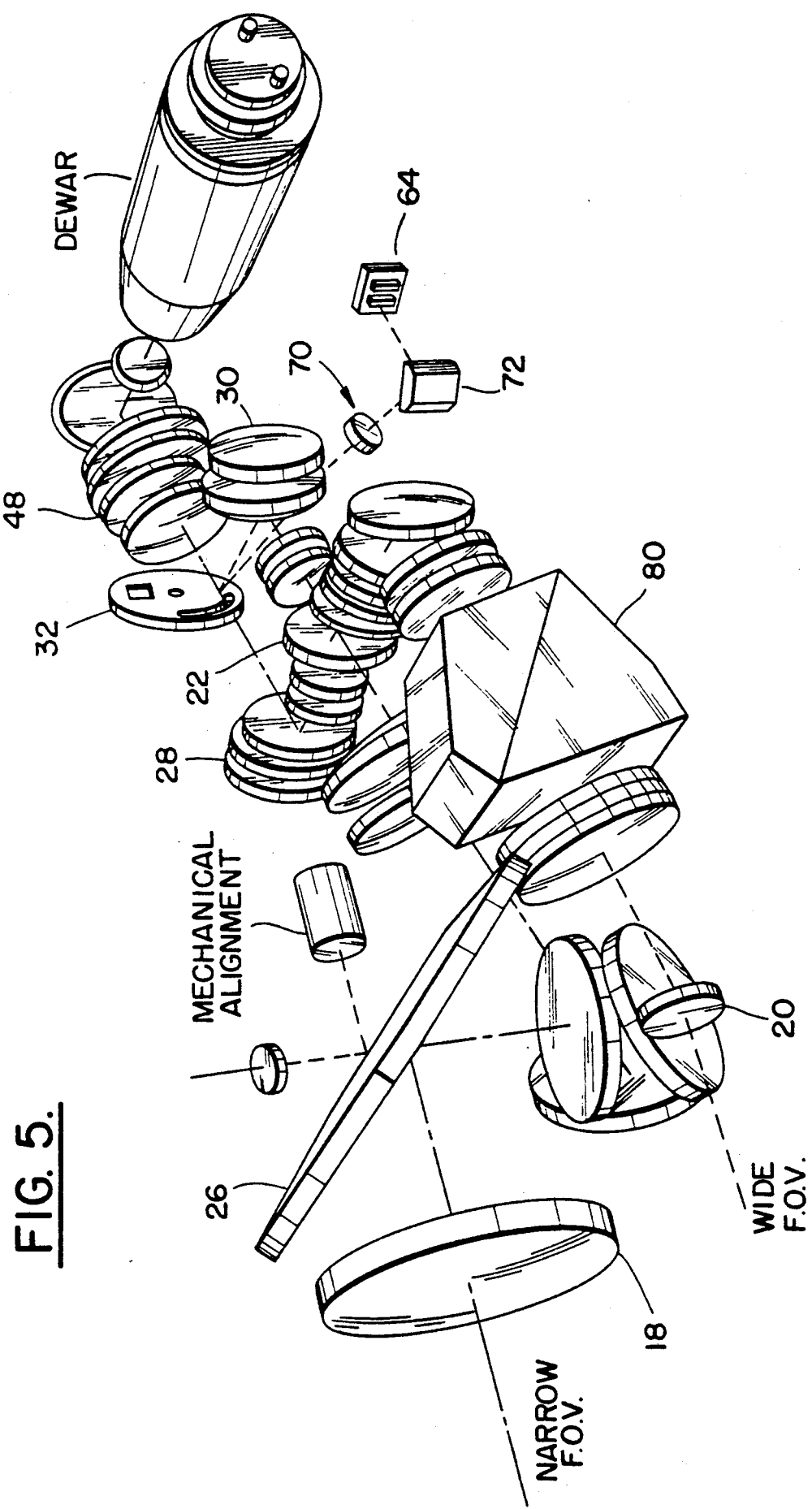

MULTIPLE FIELD OF VIEW SENSOR

This is a continuation-in-part of copending U. S. Pat. Application, Ser. No. 06/686,357, filed on Dec. 26, 1984, now abandoned.

BACKGROUND OF THE INVENTION

The present invention relates to electro-optical imaging display systems and, more particularly, to infrared systems and systems employing two or more light beams and associated electronics.

Scanning infrared sensors are known in the art. In such, sensors, an electro-optical detector converts incident electromagnetic radiation from a viewed field into an electrical signal which is then processed by a signal processor for display in an imager. A telescope unit, which can be directed to point or sight in a desired direction, receives the radiation and directs it onto a scanner having one or more reflective surfaces thereon. Motion of the scanner causes the beam to be swept across the sensitive detecting surface of a detector.

In certain imaging situations, it is desirable to view the subject through a narrow field of view and a wide field of view, the wide field of view providing a background reference useful in signal processing operations including the extraction of signal from noise. A problem arises in that with presently available imaging equipment, two separate sensors including their respective scanners, cryogenic coolers, optics, and imaging electronics must be employed to provide the two fields of view. This introduces unwanted weight, complexity and cost to the imaging and display system.

These problems were solved in the invention described in U.S. Pat. No. 4,574,197 filed Mar. 24, 1983 entitled "Dual Field of View Sensor" by W. W. Kliever In that invention, a multifaceted polygon wheel scanner shares the inputs from wide and narrow field of view optics and the outputs to detector, one or more displays, and associated electronic and cooling mechanisms. It comprises a scanning infrared sensor or the like employing a scanner, a detector, a beam clipper or equivalent, and a signal processor. A first optical assembly is employed to direct light entering from a first line of sight against the reflective surfaces of a rotating polygon scanner so that the light is sequentially reflected from the facets of the scanner across the detector in a sweeping scan pattern to produce a signal therefrom. A second optical assembly directs light entering from a second line of sight against the reflective surface of the scanner at a point displaced one-half its facet angle for enabling the detector and signal processor and any other mechanisms to be time-shared Thus, light from the first and second lines of sight are interleaved and swept, one at a time, across the detector.

The polygon wheel scanner utilized in the invention in U.S. Pat. No. 4,574,197 accommodates a small telescope exit pupil and, if a large unit pupil were desired, the polygon facetes would have to be appropriately enlarged, thus requiring a larger polygon diameter and wheel. Where space, weight and cost are important considerations, such enlargement has obvious limitations.

In addition, if the scanner must be stopped and started instantaneously, the mass of the scanner must be kept to a minimum. The multifaceted polygon wheel described above has mass sufficiently large to require several seconds for the wheel to stop or start. Thus, its mass militates against its use where instantaneous starting and stopping is required, such as a transition from a scanning mode for a narrow field of view to a wide field employing another mirror.

SUMMARY OF THE INVENTION

The present invention overcomes these and other problems. Two or more fields of view or images of scenes are generated using a single sensor instead of separate sensors. Typically, two fields of view for narrow and wide viewing are generated with two independent telescopes. The invention provides for the combination of the two fields of view by use of a field of view switch which comprises a chopper wheel or electro-optical switch, or the equivalent. Preferably, a rotating chopper wheel with a transparent surface and reflective surface is positioned at an intersection of non-coaxial paths of the incoming radiation from the two fields of view so that the paths of radiation are transmitted in an alternating interleaved manner to a detector. The same field of view switch can be used to perform the detector non-uniformity correction functions, such as automatic responsivity control and D.C. restoration by introducing fields of view from other reflecting surfaces. A single scanner, detector dewar, cryogenic cooler, part of the imager and signal processing are used in common for both fields of view.

Several advantages accrue therefrom. Its cost and weight are low, and the space needed is very much conserved. Associated equipment, such as the scanner, automatic responsivity control and D.C. restoration mechanisms, imager, cryogenic cooler electronics and compressor, detector assembly, focal plane electronics and preamplifiers, are common to both fields of view.

A feature in the construction of the invention is the use of a two-sided scanning mirror in conjunction with folding mirrors for directing paths of radiation from different telescopes to the opposed sides of the mirror, thereby allowing the mirror to provide simultaneously a scanning of each field of view of the respective telescopes. This construction has the advantage of providing yet a further feature wherein a folding mirror is retracted to allow propagation of a beam of radiation from an additional telescope to the common detector, thereby providing a still wider field of view in addition to the foregoing fields of view. The use of the backside mirrored surface of the scanner allows a larger pupil image without necessitating growth of the scan wheel to a prohibitive size, which is especially important for the high performance sensors. Also, the implementation on the backside allows use, for example, of a focal plane array, without a bidirectional readout.

Other aims and objects as well as a more complete understanding of the present invention will appear from the following explanation of exemplary embodiments and the accompanying drawings thereof.

BRIEF DESCRIPTION OF THE DRAWINGS

FIG. 2a is a diagrammatic view of an optical portion of the system of FIG. 1;

FIG. 2b is a view of a mirrored chopper wheel taken along line 2b—2b of FIG. 2a;

FIG. 3 is a diagram showing the scanner/field of use with typical timing for purposes of illustration;

FIG. 4b is a view of a mirrored chopper wheel taken along line 4b—4b of FIG. 4a;

FIG. 5 illustrates an opto-mechanical three dimensional layout of the present invention.

DETAILED DESCRIPTION OF THE INVENTION

The present invention has been designed specifically for use in infrared systems, particularly forward looking infrared (FLIR) systems. However, it is to be understood that the invention is equally applicable to any form of electromagnetic radiation and, therefore, should not be so restricted to infrared electromagnetic radiation.

Figure 1:
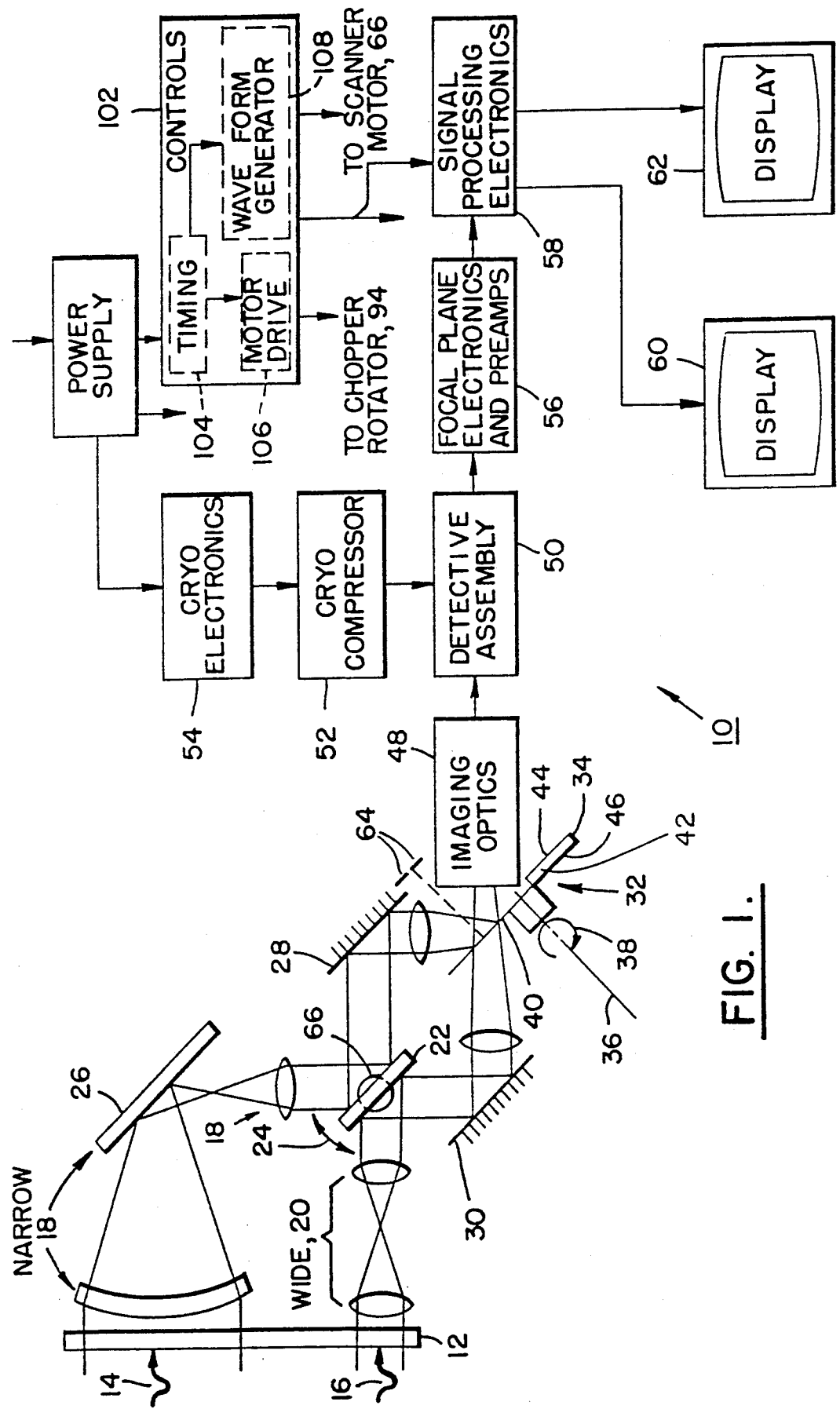
FIG. 1 is a system functional block diagram of the present invention.

Accordingly, as shown in FIG. 1, a system 10 is arranged to view two scenes through an infrared (IR) window 12, which is constructed of conventional materials, it being understood that separate windows may be used for each telescope. As shown, infrared radiation enters through the window from a scene or scenes for narrow field of viewing and wide field of viewing, the infrared radiation being respectively designated by indicia 14 and 16.

Radiations 14 and 16 pass through window 12 into a narrow field of view telescope 18 and a wide field of view telescope 20, the telescopes being represented respectively by an individual and a pair of lenses. It is to be understood, however, that such an illustration of single optical elements is representative of an assemblage of various optical elements, as is well known in the art.

The radiations accessed by telescopes 18 and 20 are directed to a bidirectional double-sided mirror scanner 22 which, as represented by double headed arrow 24, pivots back and forth to scan the scene or scenes. As shown, radiation 16 from wide field of view telescope 20 is transmitted directly onto mirror scanner 22, while radiation 14 passing through narrow field of view telescope 18 is directed onto the mirror scanner 22 through a folding mirror 26. It is, again, to be understood that any suitable optical directing arrangement may be used. Radiation 14 from telescope 18 and radiation 16 from telescope 20 are directed onto opposite sides of mirror scanner 22. A mirrored surface of the scanner 22 directs the radiations 14 and 16 respectively to folding mirrors 28 and 30, which direct the radiations through suitable optics to a switching mechanism or optical switch 32 which switches the field of view.

In its preferred embodiment, switch 32 comprises a chopper wheel 34 which rotates about an axis 36 as generally denoted by arrow 38. Wheel 34 is provided with minimum of two sections, one of which comprises a transparent section 40 and a mirrored surface 42 Surface 42 must be mirrored on its front face 44; however, if desired, it may also be mirrored on its back surface 46. When the wheel is rotating, either one or the other of transparent section 40 or reflective surface 42 is positioned where narrow field-of-view radiation 14 and wide field-of-view radiation 16 intersect. When transparent section 40 is at this intersection, both radiations 14 and 16 pass through the transparent section so that, as viewed in FIG. 1, radiation 16 passes horizontally to the right to imaging optics 48 while radiation 14 passes vertically downward to be absorbed by conventional means, not shown. When rotating wheel 34 presents its mirrored surface 42 at the intersection of the two infrared radiation 14 and 16, radiation 14 then is reflected horizontally to the right of the figure to imaging optics 48 while radiation 16 is either reflected from rear surface 46 downward or otherwise absorbed to prevent it from being directed horizontally to the right. Thus, the radiation from plural fields of view are alternately or serially scanned in an interleaved manner towards the imaging optics 48. While a rotating wheel 34 is illustrated, specifically a rotating wheel having a transparent section and a mirrored surface thereon, it is to be understood that any other electro-optical switch may be used therefor.

The imaging optics 48 are placed adjacent to switch 32 to focus the radiation into a detective assembly 50 having focal plane detectors (not shown) therein. Assembly 50 is suitably cooled by cryogenic cooling devices, generally designated as a cryogenic compressor 52 and cryogenic electronics 54. Detective assembly 50 converts the optical radiation into electrical signals which are then forwarded to an amplifier 56 and signal processing electronics 58 for display in a pair of displays or imager 60 and 62 respectively relating to the viewed wide and narrow fields Because switch 32 permits alternate access of the infrared radiation 14 and 16, the two radiations are interleaved and applied to the various electro-optical mechanisms 48, 50, 56, 58 whose functions, therefore, can be time-shared.

In operation, the infrared scene radiation passes through IR window 12 and enters through narrow field of view (NFOV) and wide field of view (WFOV) telescopes 18 and 20. Bidirectional two-sided mirror scanner 22 is used to scan both the narrow field of view and the wide field of view. Scanner 22 scans the scene across the detectors on the focal plane in detective assembly 50. The wide field of view is scanned on one side of mirror scanner 22 and the narrow field of view is scanned on the other side of the mirror scanner 22.

Field of view switch 32, which as described above comprises chopper wheel 34, runs synchronously with scanner 22. While the wide field of view is being scanned by the scanner, the scene radiation is being viewed by the detectors for both the narrow and wide fields of view. Directly before the start of each field of view scan, thermal reference sources 64 flood the focal plane in detective assembly 50 with radiation from one of the thermal sources 64. A detection of radiation from these sources will be described hereinafter. These sources are used in conjunction with well-known circuitry (not shown) for automatic responsivity control (ARC) and D.C. restoration (DCR), which correct column-to-column focal plane array non-uniformities. The infrared radiation is then imaged by the imaging optics 48 onto detective assembly 50, which consists of the focal plane array (FPA) and a dewar.

The detectors convert the infrared scene radiation into an electrical signal which is multiplexed by well-known charge-coupled devices or other circuitry (not shown), amplified by preamplifiers, and video processed in electronics 56 and 58. The signals are then displayed on two separate displays 60 and 62 or a single display resulting in two infrared images of the two scenes.

The configuration shown in FIG. 1 is also useable for radiation in the visible part of the spectrum instead of IR as shown by using the appropriate optics and detectors. Moreover, if the focal plane responds in the visible and IR, a mix of IR and visible images are produced. In addition, by using another field-of-view switch before the scanner on either or both the wide field of view or narrow field of view, as will be described with reference to FIG. 6, a multiple field of view sensor is obtained.

As illustrated in FIGS. 2a and 2b, scanner 22, which is a single scanner, is used for scanning both narrow and wide fields of view. The scanner 22 includes a motor 66 which is driven by a triangularly shaped electrical signal as shown in FIG. 3. As the scanner 22 pivots in both counter-clockwise and clockwise directions, it scans the wide field of view and the narrow field of view, respectively. Moreover, the two objects shown, AB and CD for narrow field of view and wide field of view, respectively, are imaged at A'B' and C'D' on the focal plane array and scanned in the same direction. The contributions of the respective scan lines are integrated over the time of a frame of the raster scan to form a complete image of a scene in a process known as time delay integration (TDI). The optics of the telescopes 18 and 20 provide points of image inversion (FIG. 2a), this being a characteristic of reimaging operation of the system 10. The arrows AB and CD show the object images as they propagate through the optics. In a similar manner, there are no left/right inversions from object space to image space on the focal plane array.

The switching between the narrow field of view to wide field of view and vice-versa is accomplished with the use of chopper wheel 34. In addition, the narrow field of view/wide field of view chopper is used for automatic responsivity control, and D.C. restoration. As shown in FIG. 2, part of the wheel is reflective and the other part is transparent. Thus, as it rotates, when the narrow field of view impinges on the reflective part, the detectors view the outside world through the narrow field of view while the wide field of view is obscured by the back of the reflective part of the chopper wheel When the reflective part of the wheel rotates further, it no longer reflects the narrow field of view. The transparent portion of the wheel moves into position, thus allowing the wide field of view to impinge on the detectors. The detectors then, view the outside world through the wide field of view telescope.

Directly after the chopper wheel switches fields, the automatic responsivity control/D.C. restoration processes take place. The line-of-sight of the detectors are reflected off reflecting segments 68 the chopper wheel and onto two reference thermal sources 64. As shown in the scanner/field-of-view switch timing diagram in FIG. 3, both wide and narrow fields of view are continuously updated at a frame rate. The times allotted for each field-field of view switching and automatic responsivity control/D.C. restoration are typically 75 and 25 ms, respectively. Other time intervals can be used. The rising and falling periodic ramp (or sawtooth) waveforms depict the amplitude of current applied to the scanner motor 66 for deflecting the mirrored surfaces of the scanner with oscillatory motion for scanning the narrow and wide fields of view. The cross-section of the beam at the chopper wheel is very small, located at or near a re-imaging section of the beam, to reduce the narrow field of view/wide field of view transition time, and vice-versa.

Both chopper wheel 34 and scanner 22 run synchronously. Thus, both are locked onto the same clock so that they are in the proper phase, i.e., when the narrow field of view is being scanned by the scanner, the reflective section of the chopper wheel is in the correct position to reflect it onto the detective assembly through the imaging optics.

Figure 4A:
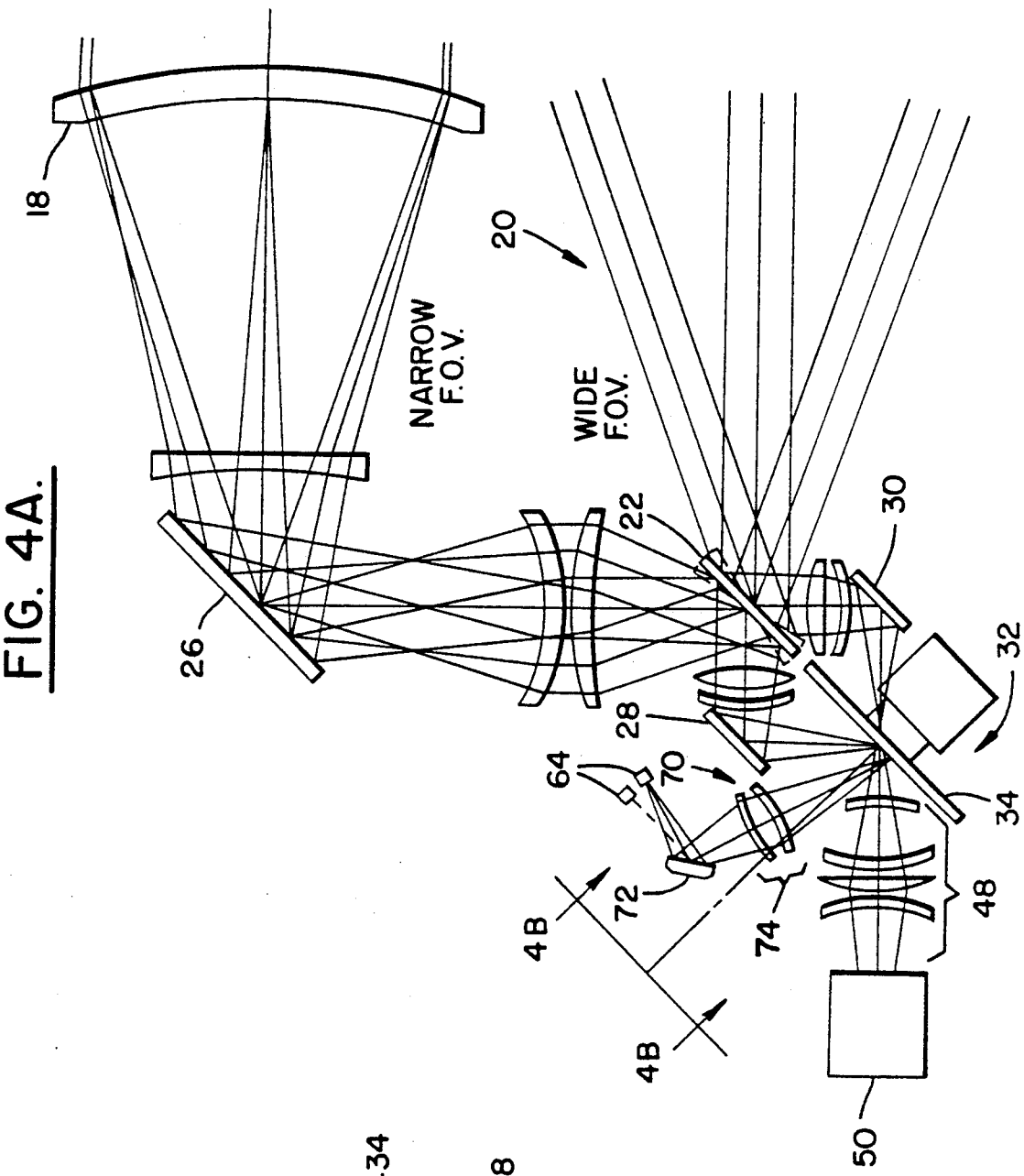
FIG. 4a depicts ray tracing the system breadboard layout of the present invention.

FIG. 4a shows ray tracing for radiation of the telescope 18 for the narrow field of view, and also shows rays swept across a wide field of view of the telescope 20. The optical elements of the telescope 20 nave been deleted to simplify the figure. An optical system 70 comprising mirror 72 and lens assembly 74 is provided for directing rays of radiation from either of the thermal reference sources 64 to the chopper wheel 34 of the field-of-view switch 32.

Figure 4B:
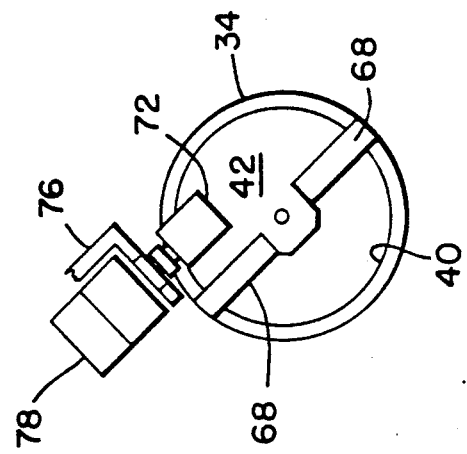

In FIG. 4b, the mirror 72 is shown positioned in front of the chopper wheel 34 by a bracket 76. A motor 78 is supported by the bracket 76 and tilts mirror 72 for selection of one of the sources 64. Individual ones of the sources 64 have different temperatures to better match subject matter of scenes being imaged, thereby to provide a more accurate responsivity control and D.C. restoration. A well-known drive circuit, not shown, operates the motor 78 to position the mirror 72 for selection of the desired source 64.

As shown in FIGS. 2b and 4b, the reflecting segments 68 of chopper wheel 34 are positioned at interfaces of the transparent section 40 and mirrored surface 42. The length of arc subtended by each segment 68 is only a fraction of the length of arc subtended by mirrored surface 42, and corresponds to the length of time shown in FIG. 3 for the responsivity control and D.C. restoration. The segments 68 are angled relative to the plane of mirrored surface 42 for directing rays from lens assembly 74 to imaging optics 48. In accordance with a feature of the invention, the combination of transparent section 40 with mirrored surface 42 and reflecting segments 68 provide the switch 32 with the capacity for switching between three separate fields of view.

FIG. 5 snows the mechanical arrangement of the components of the system 10, the major components being indicated directly on the drawing. Also included is a Pechan prism 80 which derotates the image to preserve the original orientation of the scene.

Figure 6:
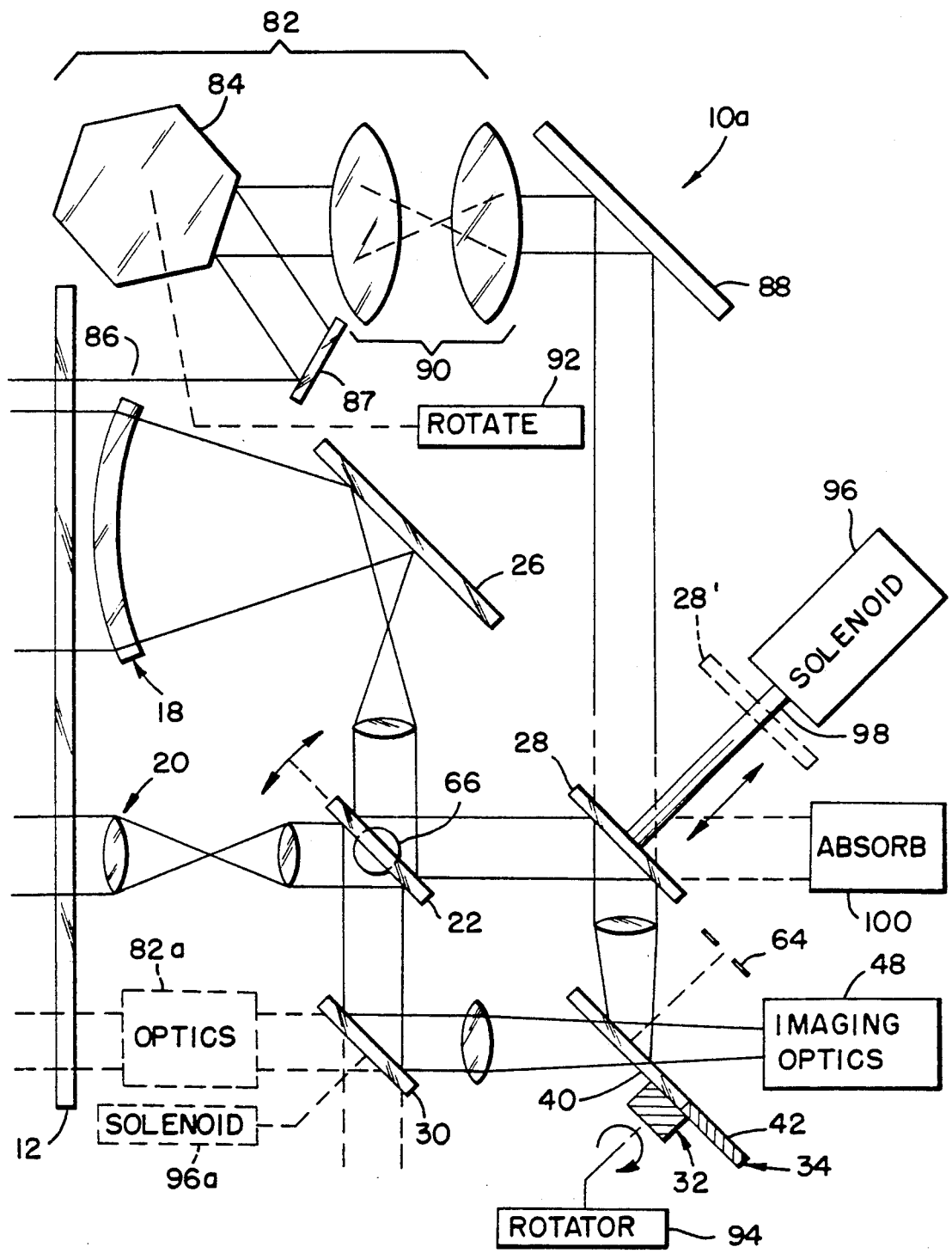
FIG. 6 shows a modification of the optical system of FIG. 2b providing for the retraction of a folding mirror for entry of a further field of view to a radiation detector.

In FIG. 6 there is shown still further optical structure, in accordance with the invention, for introducing capability to the system 10 of FIG. 1 for switching between still further fields of view. The system 10a of FIG. 6 comprises scanning optics 82 for viewing a still wider field of view, preferably a hemisphere, via the window 12. The scanning optics 82 includes a rotating prism 84 for scanning incoming rays 86 of scene radiation, as reflected by folding mirror 87, and for directing the rays 86 towards a folding mirror 88 via lens assembly 90 included within the scanning optics 82. Mirror 88 is positioned for directing the rays 86 towards field-of-view switch 32. Also shown are rotators 92 and 94 including motorized electric drives (not shown) for rotating prism 84 and the chopper wheel 34 of switch 32.

The additional field of view of scanning optics 82 is introduced to imaging optics 48 by retraction of folding mirror 28 to a position 28' by a solenoid 96 having a plunger 98 which supports mirror 28 in either its normal position or retracted position. Retraction of mirror 28 allows rays 14 from the telescope 18 to pass directly to an absorber 100 for removal from the system 10a, instead of to imaging optics 48, while the rays 86 from scanning optics 82 propagate along the original path or rays 14 between the normal position of mirror 28 and chopper wheel 34 to the imaging optics 48. Thereby, operation of the solenoid 96 by conventional circuitry (not shown) provides a switching function in addition to that of switch 32 for introducing either the scene viewed by telescope 18 or the scene viewed by scanning optics 82. Yet another switching function may be introduced, if desired, by use of scanning optics 82a and solenoid 96a, shown in phantom, which operate with folding mirror 30 in the same manner as has just been described with reference to the operation of scanning optics 82 and solenoid 96 with mirror 28. Such switching operation with folding mirror 30 alternately applies the scene viewed by telescope 20 with the scene viewed by scanning optics 82a to switch 32 and imaging optics 48.

Synchronization of the components of the systems 10 and 10a is shown in FIG. 1 wherein control circuitry 102 comprises a timing unit 104, a motor drive circuit 106 and a waveform generator 108. In response to timing signals of the unit 104, the circuit 106 generates a drive signal to operate the chopper rotator 94 (as well as the rotator 92 of FIG. 6), and the generator 108 generates a triangular waveform for operating the scanner motor 66.

Although the invention has been described with reference to particular embodiments thereof, it should be realized that various changes and modifications may be made therein without departing from the spirit and scope of the invention.

What is claimed is:

1. A multiple field of view sensor comprising:
   a detector;
   means for viewing at plural fields of view and for acquiring electromagnetic radiation therefrom;
   scanner means optically coupled to said viewing means, said scanner means comprising an oscillating mirror means, said viewing means including means for directing radiations of a first and a second of the plural fields of view toward said oscillating mirror means to effect a simultaneous scanning of said first and said second fields of view by said oscillating mirror means, said scanner means further comprising folding optics for directing radiations of scanned fields of view from said mirror means to a common intersection;
   a switch disposed at said intersection and synchronizd with said scanner means for alternately directing the radiations of said first and said second fields of view to said detector, said switch comprising a rotating wheel having sections thereon for the alternate directing of the radiation to said detector, one of said sections being a mirrored surface disposed parallel to a plane of rotation of said wheel; and
   wherein a second section of said wheel is a reflector extending radially along said wheel and being angled relative to said plane of rotation.

2. A multiple field of view sensor comprising:
   a detector;
   means for viewing at plural fields of view and for acquiring electromagnetic radiation therefrom;
   scanner means optically coupled to said viewing means, said scanner means comprising an oscillating mirror means, said viewing means including means for directing radiations of a first and a second of the plural fields of view toward said oscillating mirror means to effect a simultaneous scanning of said first and said second fields of view by said oscillating mirror means, said scanner means further comprising folding optics for directing radiations of scanned fields of view from said mirror means to a common intersection;
   a switch disposed at said intersection and synchronized with said scanner means for alternately directing the radiations of said first and said second fields of view to said detector, said switch comprising a rotating wheel having sections thereon for the alternate directing of the radiation to said detector, one of said sections being a mirrored surface disposed parallel to a plane of rotation of said wheel; and
   wherein a second section of said wheel is a reflector extending radially along said wheel and being angled relative to said plane of rotation, and wherein a third section of said wheel is transparent, each of said sections admitting a separate field of view to said detector for a total of three fields of view.

3. A sensor according to claim 2 further comprising a second switch serially coupled along an optical path with said first mentioned switch for substituting a fourth field of view in place of one of said three fields of view.

4. A sensor according to claim 3 wherein said folding optics includes a folding element, and wherein said second switch includes means for displacing said folding element from an optical path of one of said three fields of view.

5. A multiple field of view sensor comprising:
   a detector;
   means for viewing at plural fields of view and for acquiring electromagnetic radiation therefrom;
   scanner means optically coupled to said viewing means, said scanner means comprising an oscillating mirror means, said viewing means including means for directing radiations of a first and a second of the plural fields of view toward said oscillating mirror means to effect a simultaneous scanning of said first and said second fields of view by said oscillating mirror means, said scanner means further comprising folding optics for directing radiations of scanned fields of view from said mirror means to a common intersection;
   a switch disposed at said intersection and synchronized with said scanner means for alternately directing the radiations of said first and said second fields of view to said second fields of view to said detector, said switch comprising a rotating wheel having sections thereon for the alternate directing of the radiation to said detector, one of said sections being a mirrored surface disposed parallel to a plane of rotation of said wheel; and
   further comprising a second switch serially coupled along an optical path with said first mentioned switch for substituting a third field of view in place of one of said first and said second fields of view.

6. A sensor according to claim 5 wherein said folding optics includes a folding element, and wherein said second switch includes means for displacing said folding element from an optical path of one of said first and said second fields of view.

7. A sensor according to claim 6 wherein said oscillating mirror means reflects said field of view from a first side of said mirror means, and said second field of view from a second side of said mirror means.

8. A sensor according to claim 7 wherein said mirror means is a two-sided mirror having opposed reflecting surfaces.

9. A method for sensing multiple fields of view comprising the steps of:

scanning at least two fields of view with a scanner for acquiring electromagnetic radiation from the fields, said scanning including steps of illuminating a reflector simultaneously with radiation from two of said fields of view and oscillating the reflector to effect a simultaneous scanning of the two fields of view;

directing scanned radiations of the respective fields of view along separate intersecting paths through a switch for serially directing the radiation to a detector while synchronizing and scanning and directing steps, said directing including a locating of the switch at an intersection of the paths;

substituting a third field of view in place of one of the scanned fields of view outputted by said scanning step;

transmitting said third field of view to said switch for detection by said detector;

said directing step comprising the steps of utilizing a wheel having at least one transparent surface and one reflective surface thereon, and rotating the wheel to permit the radiation from individual fields of view to be directed to the detector in synchronism with the scanning; and further comprising a step of tilting a section of a reflective surface of said wheel, and introducing a reference beam of radiation via a tilted section of the reflective surface of said wheel for restoring a D.C. level to signals outputted by said detector in response to radiation incident thereon.

* * * * *